Patented Aug. 13, 1935

2,011,132

UNITED STATES PATENT OFFICE 2,011,132

PROCESS FOR POLYMERIZING VINYL COMPOUNDS

Charles O. Young and Stuart D. Douglas, Charleston, W. Va., assignors to Carbide and Carbon Chemicals Corporation, a corporation of New York No Drawing. Application April 11, 1931, Serial No. 529,543

9 Claims. (Cl. 260—2)

The invention is a process for polymerizing vinyl compounds. The process broadly comprises heating the vinyl compounds in the presence of a polymerizing catalyst with or without a solvent in contact with certain catalyst-assisting metals, such as lead, tin and aluminum, and in the absence of certain other metals, such as iron, copper, zinc and nickel or their salts, which act as catalyst-restraining agents.

Vinyl compounds may be polymerized to form resinous products for which various uses have been proposed. The polymerization is usually effected by heating the vinyl compounds with a catalyst which promotes the polymerization in the presence of a suitable solvent or liquid medium. Various substances may be used as catalysts; for example, lead tetra-ethyl, ozone or ozonides, and organic peroxides, such as benzoyl peroxide, may be used. We have found that the quality and characteristics of the polymerization products so formed are influenced to a marked extent by the conditions under which the polymerizing reaction proceeds. It is usually desirable to produce a resinous mass which is tough and resistant to heat; also, it is desirable to produce resinous masses which exhibit uniformity of properties, such as color, and to produce these resins in uniformly high yields in order that the process may be economical.

The principal object of this invention is to provide a process for preparing polymerized vinyl compounds which are uniformly colored, and tough and resistant to heat, and to produce these polymerization products in an economical manner.

We have discovered that certain metals, or their salts, affect the rate and extent of the polymerization of vinyl compounds, and control the quality of the resinous product. The application of this discovery has enabled us to achieve the object of this invention. Copper greatly restrains or even prevents the polymerization of vinyl compounds unless excessive amounts of a polymerizing catalyst are added. Nickel, zinc and iron behave in much the same manner. Iron not only restrains the polymerizing reaction, but the presence of even minute quantities of iron or iron salts in the polymerization of vinyl compounds, such as five parts per million of iron in the polymerization of a mixture of vinyl chloride and vinyl acetate, causes a brittle, heat-unstable resin to be formed. This product is entirely unsatisfactory for the production of molding plastics or films.

The presence of certain other metals, notably lead, is beneficial to the polymerizing reaction, while tin and aluminum are neutral or slightly beneficial in effect. For example, if the polymerization of a mixture of vinyl chloride and vinyl acetate is carried out in a lead-lined vessel with the addition of benzoyl peroxide as a catalyst, a smooth reaction occurs which continues until nearly all of the vinyl compounds have been converted to polymeric substances. The resulting product is tough, stable and resilient and is particularly valuable for molding purposes and for the preparation of films. Tin or aluminum may be substituted for the lead surface with similar results.

We have also found that if small quantities of iron or other metals of the catalyst-restraining group or their salts are inadvertently introduced into the materials before polymerization, the detrimental action of these metals may be neutralized if a sufficient surface of lead metal is presented to the reaction as by adding lead, preferably in divided form, for example, as lead wool, to the reaction chamber. The action of tin and aluminum closely parallels that of lead in this respect, but these metals are not as satisfactory as lead for this purpose.

The effect of the presence of various metals upon the rate and completeness of the polymerization of vinyl compounds is illustrated by the following experimental data:

Eight tests were carried out in each of which 20 grams of vinyl acetate and 1.4 grams of benzoyl peroxide were heated in a glass vessel with the addition of a small amount of metal as indicated below.

| Metal | Heating time to start polymerization—minutes | Heating time to complete polymerization—minutes |
|---|---|---|
| None | 1.50 | 6.5. |
| Lead | 0.75 | 5.5. |
| Aluminum | 0.75 | 12.0. |
| Tin | 2.50 | 15.0. |
| Iron | More than 5.0 | More than 20.0. |
| Zinc | More than 5.0 | More than 20.0. |
| Nickel | More than 5.0 | More than 20.0. |
| Copper | More than 5.0 | More than 20.0. |

These results clearly indicate the beneficial action of lead, the neutral nature of tin and aluminum and the restraining effect of iron, zinc, copper and nickel.

The following examples of polymerization processes will further serve to illustrate our invention.

I. A mixture of 320 pounds of vinyl chloride, 80 pounds of vinyl acetate, 600 pounds of acetone and 4 pounds of benzoyl peroxide was heated to 40° C. for 60 hours in a lead-lined autoclave. The resulting product was a tough, heat-resistant resin which exhibited excellent qualities for general use.

II. A mixture of the same materials in the same proportion as described in Example I, but using vinyl acetate, acetone and benzoyl peroxide which were contaminated with iron in various forms, was heated in a similar manner in the same autoclave. The resulting resin was brittle, weak, unstable toward heat and generally unsatisfactory. In addition, a much lower yield of resin was obtained.

III. A polymerization reaction was carried out with the materials of Example I and in the same manner. As in Example II, these materials were contaminated with iron. One hundred pounds of lead wool were added to the autoclave. The reaction proceeded nearly as well as in Example I and a fairly tough, useful resin was produced. This resin was much superior to the product obtained in Example II without the inclusion of the lead wool in the autoclave.

IV. A mixture containing 5 pounds of vinyl chloride, 5 pounds of acetone and 0.05 pounds of benzoyl peroxide was heated at 40° C. for 60 hours in a clean, lead-lined autoclave. A good yield of useful polymeric vinyl chloride was obtained.

V. To a mixture of the same proportions and materials described in Example IV was added enough ferric sulfate to produce a concentration of five parts per million of iron in the solution. This mixture was heated in a lead-lined autoclave for 60 hours at 40° C. A poor yield of brittle, unstable and thoroughly unsatisfactory resin was obtained. This example emphasizes the minuteness of the concentrations of iron which are sufficient to injure the quality of the polymerization products.

VI. A mixture of 5 pounds of vinyl chloride, 5 pounds of acetone and 0.05 pounds of benzoyl peroxide was charged into an autoclave containing a relatively large area of exposed metallic iron. The autoclave was then heated at 40° C. for 60 hours. The resulting solution was thin, indicating incomplete polymerization, and yellow in color. The resin obtained was weak, brittle and unstable toward heat.

The foregoing examples illustrate the effect of iron and lead upon the polymerization of vinyl compounds, particularly vinyl halides, vinyl esters of aliphatic acids and mixtures thereof. Lead similarly counteracts the detrimental effects of copper, nickel or zinc as well as iron. Tin and aluminum may be substituted for lead, but these metals are more nearly neutral to the polymerization reaction.

We wish to emphasize the fact that quantities of iron, or other metals of the catalyst-restraining group, which might easily be considered insignificant are sufficient to seriously impair the quality of the resinous product.

It will be plain that this invention is susceptible of modification, and such modifications are included within the invention as defined by the appended claims.

We claim:

1. A process for polymerizing vinyl compounds of the group consisting of vinyl halides, vinyl esters of lower fatty acids, and mixtures thereof which comprises heating the vinyl compounds with a polymerizing catalyst in the presence of a catalyst-assisting metal of the group consisting of lead, tin and aluminum.

2. A process for polymerizing vinyl compounds of the group consisting of vinyl halides, vinyl esters of lower fatty acids, and mixtures thereof which comprises heating the vinyl compounds with a polymerizing catalyst in the presence of metallic lead.

3. A process of polymerizing vinyl compounds of the group consisting of vinyl halides, vinyl esters of lower fatty acids, and mixtures thereof which comprises heating the vinyl compounds with benzoyl peroxide in the presence of a metal of the hereindescribed catalyst-assisting group consisting of lead, tin and aluminum.

4. A process for polymerizing vinyl compounds of the group consisting of vinyl halides, vinyl esters of lower fatty acids, and mixtures thereof which comprises heating the vinyl compounds with benzoyl peroxide in the presence of metallic lead.

5. A process for producing vinyl resins which comprises conjointly polymerizing a vinyl halide and a vinyl ester of a lower fatty acid by the aid of heat and a catalyst in the presence of a catalyst-assisting metal of the group consisting of lead, tin and aluminum.

6. A process for producing vinyl resins which comprises conjointly polymerizing vinyl chloride and vinyl acetate with a polymerizing catalyst in the presence of metallic lead.

7. An artificial resin identical with a product made according to claim 1, said product being free from metals of the hereindescribed catalyst-restraining group consisting of iron, copper, zinc and nickel, and being tough, resilient, stable and resistant to heat.

8. An artificial resin identical with a product made according to claim 5, said product being free from metals of the hereindescribed catalyst-restraining group consisting of iron, copper, zinc and nickel, and being tough, resilient, stable and resistant to heat.

9. An artificial resin identical with a product made according to claim 6, said product being free from metals of the hereindescribed catalyst-restraining group consisting of iron, copper, zinc and nickel, and being tough, resilient, stable and resistant to heat.

CHARLES O. YOUNG.
STUART D. DOUGLAS.